United States Patent

Stuart

[15] 3,640,352
[45] Feb. 8, 1972

[54] ROTARY DRILL ASSEMBLY
[72] Inventor: Robert W. Stuart, 13739 Hughes Lane, Dallas, Tex. 75240
[22] Filed: Dec. 12, 1969
[21] Appl. No.: 884,494

[52] U.S. Cl.............................175/107, 175/333, 175/404
[51] Int. Cl............................................................E21b 3/12
[58] Field of Search...................175/333, 404, 107, 376, 173, 175/202, 319, 95, 96, 92

[56] References Cited

UNITED STATES PATENTS

| | | | |
|---|---|---|---|
| 2,030,015 | 2/1936 | McCurdy | 175/319 X |
| 2,619,325 | 11/1952 | Arutunoff | 175/107 |
| 2,626,780 | 1/1953 | Ortloff | 175/107 |
| 2,709,574 | 5/1955 | Arutunoff | 175/101 |
| 2,877,988 | 3/1959 | Cameron et al. | 175/319 |
| 3,077,936 | 2/1963 | Arutunoff | 175/404 X |
| 3,161,243 | 12/1964 | Davis | 175/319 X |

Primary Examiner—Marvin A. Champion
Assistant Examiner—Richard E. Favreau
Attorney—Kanz, Glaser & Harwood

[57] ABSTRACT

A rotary drill bit assembly is disclosed comprising a cylindrical body having a central opening in the lower face thereof which defines a chamber therewithin. An annular main cutting head is carried at the lower end of the body, and a supplemental bit assembly is supported from within the chamber which has an annular cutting head disposed perpendicular to the axis of the body and eccentric thereto. The outer radius of the supplemental cutting head and inner radius of the main cutting head substantially coincide along a line parallel to the body axis, with the outer radius of the supplemental head also extending at least to the axis of the central opening. Means are provided for rotating the supplemental cutting head relative to the main cutting head.

8 Claims, 8 Drawing Figures

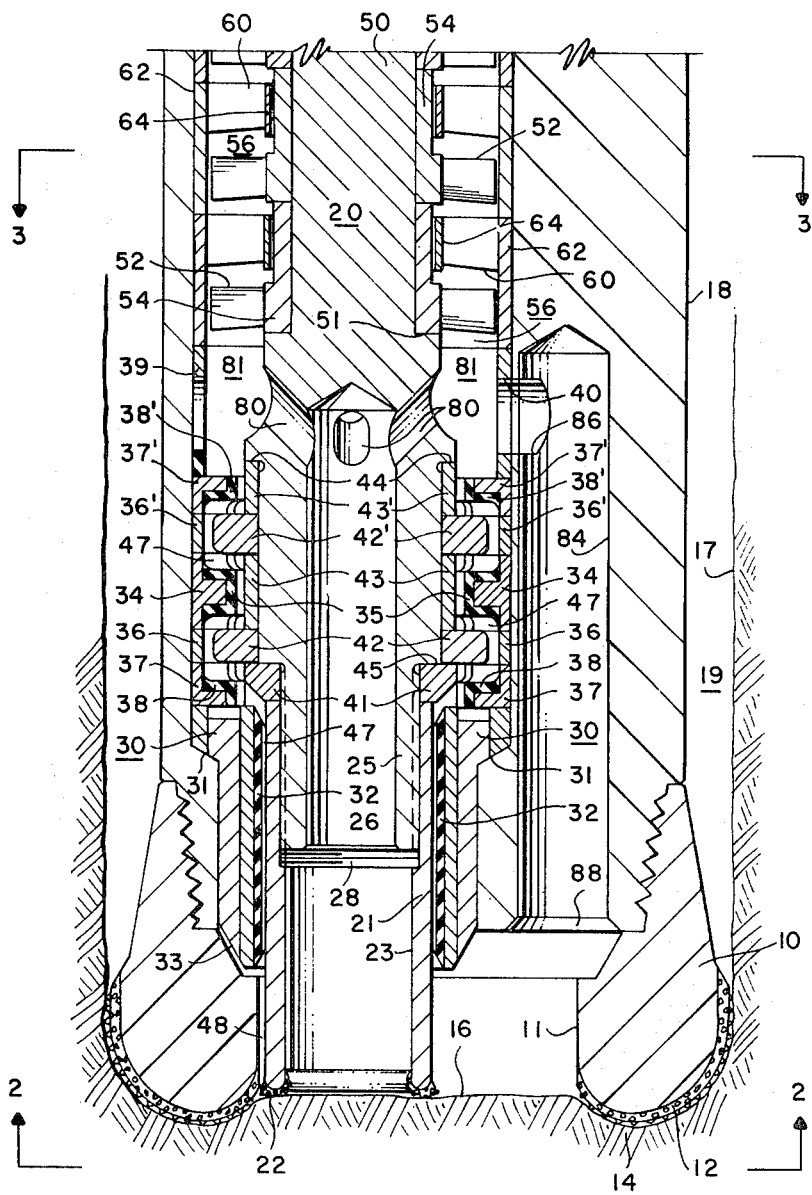
FIG. IA
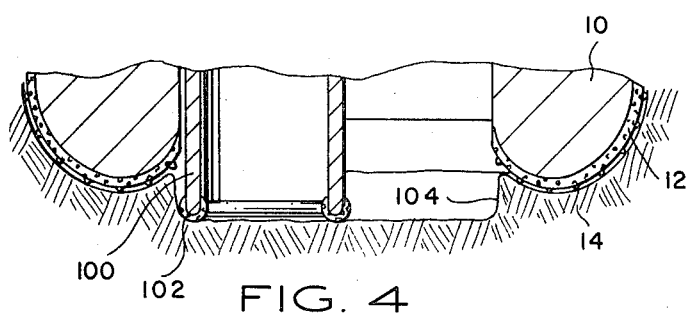
FIG. 4
INVENTOR
ROBERT W. STUART
KANZ, GLASER & HARWOOD
ATTORNEYS

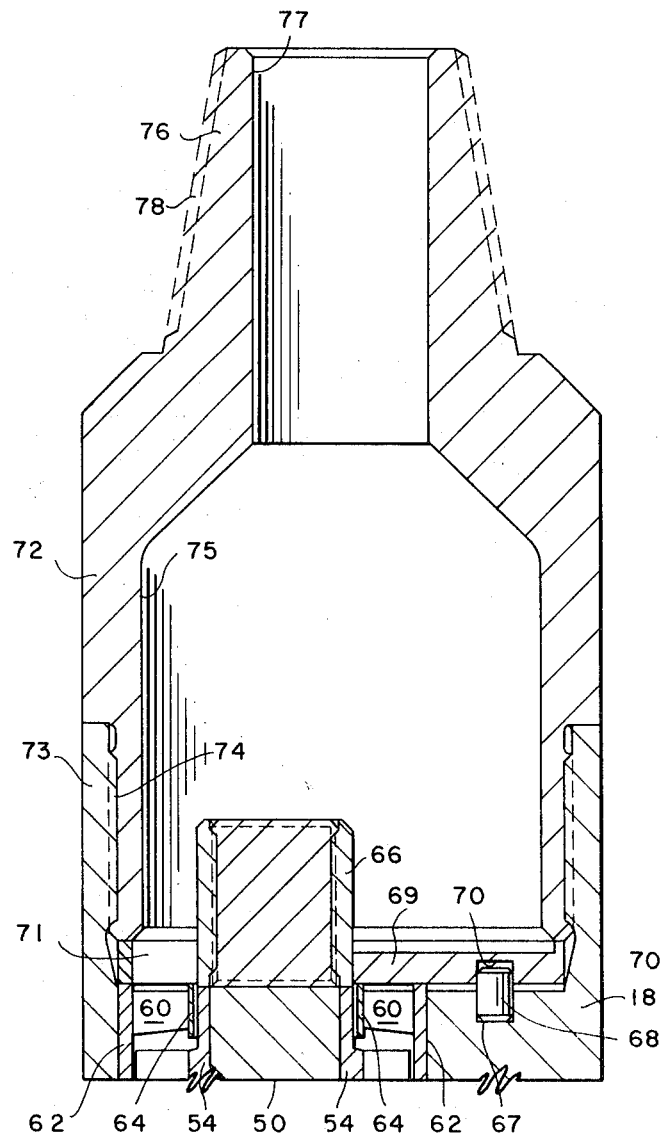
FIG. IB

INVENTOR
ROBERT W. STUART

KANZ, GLASER & HARWOOD
ATTORNEYS

ROTARY DRILL ASSEMBLY

This invention relates to rotary drill bit assemblies, and more particularly to a rotary drill bit assembly having an annular main cutting head and a supplemental cutting head disposed within the main cutting head for disintegrating material within the inner radius of the main cutting head.

Many improvements have been made in diamond drill bits in the past several years, with the aim of achieving better performance, less wear, faster drilling operations and many other features. One type of diamond drill bit employed comprises a cylindrical body adapted to be secured at its upper end to a drill collar and which carries an annular main cutting head at the lower end thereof. The cylindrical body has a central opening in the bottom thereof which defines a chamber within the body for receiving a core therein left by the main cutting head. The central core is left as the annular main cutting head penetrates the material being drilled. These bits also have supplemental bits supported from within the chamber that disintegrate the central core as the entire assembly penetrates the material.

Although this type of bit has many advantages, several problems are encountered in the use of these drill assemblies as they now exist. For example, all of these bits are supplied with drilling fluid under pressure to cool the cutting faces and to wash the cuttings up the sides of the drill stem. However, the available assemblies are not designed to achieve maximum advantage and use of the drilling fluid. Efficient cutting of the core within the confines of the main drilling face also becomes a problem if the core crumbles into relatively large pieces. Several other problems are encountered and will be discussed in more detail below. However, it is this type of drill bit assembly to which the present invention is directed.

To achieve a better understanding of the invention as will be described in detail hereinafter, several objects should be kept in mind. It is one object of the invention to provide a rotary drill bit assembly of the type generally described above that has the feature of improved drilling fluid distribution over the faces of both the main cutting head and the supplemental cutting head. This feature of the invention provides much better cooling of the cutting faces during drilling, and washes away the cuttings more efficiently. Another object is to provide means within the assembly to apply the fluid under pressure directly to the surface being drilled, thereby achieving much better control in flushing away cuttings. Yet another object is to maximize the efficiency with which the supplemental bit cutting face can cut away the core left by the main cutting face, while at the same time eliminating the jamming of the supplemental bit that ordinarily results from core crumble. Still another object is to require a minimum amount of torque to rotate the supplemental cutting head for any given penetration rate, and to require a minimum increase in torque required to rotate the supplemental cutting head as the penetration rate is increased such as by adding weight, for example.

Briefly, the drill bit assembly of the invention comprises a cylindrical body adapted to be secured at its upper end to a drill collar, and which has a central opening in the lower face thereof defining a chamber within the body. An annular main cutting head is carried on the lower end of the body through which the chamber opens. A supplemental bit assembly is supported from within the chamber which has an annular cutting head disposed perpendicular to the axis of the body and eccentric thereto. The outer radius of the supplemental cutting head and inner radius of the main cutting head substantially coincide along a line parallel to the axis of the body with the outer radius of the supplemental head also extending at least to the axis of the central opening of the body. Means are provided within the body for rotating the supplemental bit relative to the cylindrical body, or relative to the main cutting head. The supplemental bit is also rotated with the main cutting head. In one embodiment, the annular cutting head of the supplemental bit is disposed above the face of the main cutting head, thereby effecting the cutting away of the core left by the main cutting body extending up into the central opening. In yet another embodiment, the annular cutting face of the supplemental bit extends below the face of the main cutting body, thereby cutting a cylindrical hole in advance of the main cutting body.

Any suitable means can be employed to rotate the supplemental bit relative to the main cutting body, such as fluid actuated motor comprising vanes attached to the supplemental bit and to the interior of the cylindrical body. An electric motor, for example, can also be employed for this purpose. In the case of a fluid motor, drilling fluid is passed between the vanes to cause relative rotation between the cylindrical body and the supplemental bit. Passages are provided in the assembly to transmit the drilling fluid to the cutting faces.

An important feature of the invention is in the provision of the annular cutting head of the supplemental bit perpendicular to the axis of the body, so that the face thereof is horizontally disposed during the vertical drilling operations. The annular configuration of the supplemental head provides more efficient cutting and removes all of the material between the annular main cutting head as it is rotated.

Other objects, features and advantages of the invention will become readily apparent from the following detailed description thereof when taken in conjunction with the appended claims and the attached drawing wherein like reference numerals refer to like parts throughout the several figures, and in which:

FIG. 1A is a fragmentary, side elevational view, in section, of the lower portion of one embodiment of the rotary drill bit assembly of the invention;

FIG. 1B is a fragmentary, side elevational view, in section, of the upper portion of the embodiment shown in FIG. 1A;

FIG. 4 is a fragmentary, side elevational view, in section, of the bottom portion of another embodiment of the invention;

Figure 2:
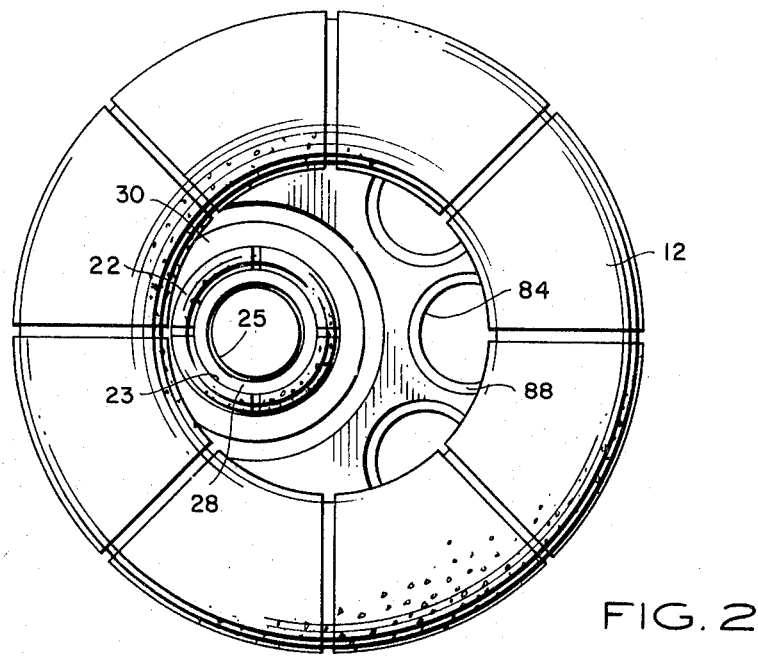
FIG. 2 is a bottom view of the drill bit assembly shown in FIG. 1A.
Figure 3:
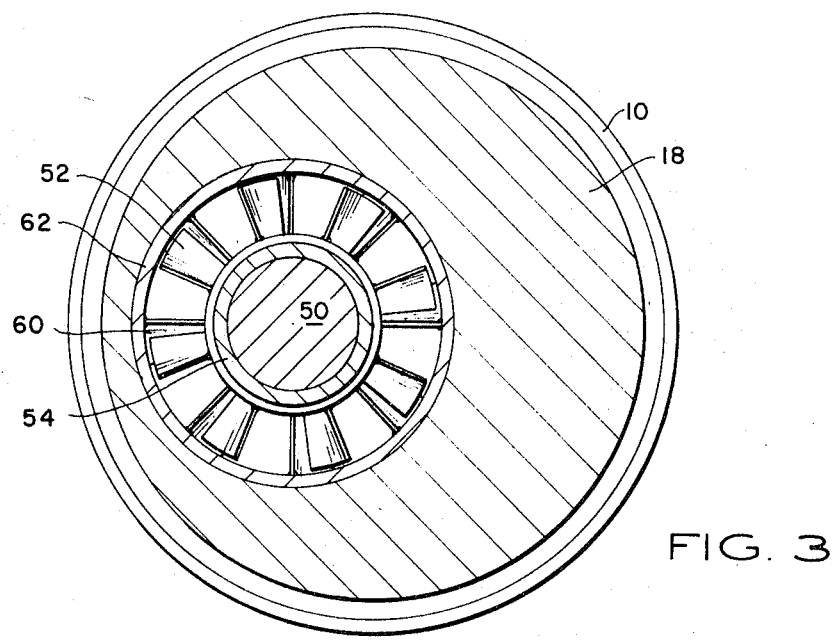
FIG. 3 is a section view of the assembly shown in FIG. 1A, taken through section lines 3—3 thereof.

One embodiment of the invention is shown in FIG. 1A, with FIG. 1B showing the upper portion thereof. Reference is also made to the bottom view of this assembly shown in FIG. 2, and the sectional view of the fluid motor shown in FIG. 3. This assembly comprises an annular, main cutting head 10, with diamonds held in the bottom and outer surfaces thereof forming a cutting face 12, to cut away the material 14 therebeneath. The main cutting head has a central recess 11 therein into which extends a central core 16 of the material left by the main cutting head. The main cutting head is secured by any suitable means to a cylindrical body 18, and the cylindrical body is attached at its upper end to a cap 72 as shown in FIG. 1B. It will be understood that the cap is attached to the lower end of a drill stem. The cylindrical body defines a chamber 81 therein for accommodating a supplemental bit assembly to be described hereinafter, and through which drilling fluid is forced to emerge at the cutting faces. The outside diameter of the main drilling head is larger than the outside diameter of the cylindrical member 18 and drill stem, so that an annular space 19 is left between the cylindrical body and the sidewall 17 of the hole as the drill progresses downward. Thus cuttings can pass up the base hole through space 19.

A supplemental bit assembly 20 is supported from within the chamber 81 of the cylindrical body 18, and terminates in an annular lower bit end 21 having an annular, diamond cutting face 22. The annular face 22 is disposed above the lower extremity of the face of the main cutting head to cut away the core 16 that extends upward into chamber 11, and is eccentric relative to the axis of the cylindrical body. The periphery of the supplemental head also substantially coincides with the inner radius of the main cutting head along a line parallel to the axis of the assembly, and extends at least to the axis of the opening 11 within the main cutting head, all as shown. As will be seen hereinafter, means are provided for rotating the supplemental bit relative to the main cutting head, while at the same time, the supplemental bit and face thereof are carried with the main drilling head as the latter is rotated. Thus an annular cavity is drilled by the main cutting head, whereas the annular face of the supplemental bit cuts away the core as the supplemental bit is rotated with the main head while also being rotated relative thereto. It is important to note that the face of the auxiliary head is perpendicular to the axis of the cylindrical body, so that all of the bottom surface thereof is in contact with the material 16. This also causes the face of the supplemental head to be horizontally disposed if the entire assembly is vertical. In addition, the cutting face of the supplemental head extends between the edge of the core and at least the central axis of opening 11, so that all of the core is removed. Better fluid distribution is provided across this face because of the full contact between the cutting face of the supplemental head and the core. In contrast, much poorer fluid distribution is achieved when the cutting face of the supplemental head overhangs the core, for example, or when this face is disposed at an angle to the top surface of the core. A minimum amount of torque is required to rotate the supplemental annular head, whereas a much greater torque is required if the head has a full circular face. In addition, less effective cutting is achieved for a full face.

The lower portion or head 21 of the supplemental assembly extends upwardly in the chamber and constitutes a lower extension of a cylindrical main body portion 24. The head portion 21 may be threaded onto the main body, along threads 26, for example. The head 21 defines a chamber 23 therein that communicates with a chamber 25 defined within the main body portion 24 through opening 28 in the bottom of the main body portion. The main body portion 24 also includes a solid stem 50 constituting an upward extension thereof, which stem extends upward into a cap 72 as will be described.

Although various bearing arrangements can be employed to support the supplemental bit assembly within the body 18, a description of one specific arrangement will now be given. A generally annular, elongated lower bearing assembly 30 is seated within the body 18 in the lower end thereof on corresponding beveled shoulders 31 provided on the assembly and the inner wall of the body. Circumferentially spaced apart rubber ribs 32 are vulcanized onto the inner wall of the assembly and extend essentially along the vertical length thereof. Thus vertical passageways are provided between adjacent ribs for the passagewray therethrough of drilling fluid. Rubber is employed as the bearing surface to minimize wear thereof due to cuttings produced by the drilling operation.

Another component of an upper thrust bearing assembly is stacked onto the top shoulder of the lower radial bearing assembly, and comprises a full bearing assembly 34 having a vulcanized face 35, a first half-assembly 37 having a rubber face 38 adjacent assembly 30, an annular, metal spacer 36 separating assemblies 34 and 37, another half-assembly 37' having rubber face 38' disposed at the top, and another spacer 36' separating assemblies 34 and 37'. It will be understood that the parts are stacked one on the other in the order shown, with the outer bearing assembly being radially spaced apart from the inner component to be described below. Another annular spacer 39, having ports 40, is stacked on top of the upper bearing assembly.

An annular shoulder and spacer 41 surrounds the main body 24 of the supplemental bit and is held between the top of the head portion 21 and shoulder 45 on the main body. A thrust disc 42 is stacked on and supported by spacer 41, an annular thrust sleeve 43 is stacked on and supported by disc 42, and additional disc 42' and sleeve 43' are carried thereabove as shown, with sleeve 43' abutting shoulder 44 of the main body. All of components 41, 42, 43, 42' and 43' are assembled onto the main body portion and then secured in place as the head portion 21 is threaded onto the lower portion of the main body. A tortuous passageway 47 is provided between the bearing assemblies on the body 18 and the discs and sleeves on the supplemental bit for the passage therethrough of fluid. Moreover, a small space 48 is left between the main cutting head 10 and supplemental head 21 for the passage of fluid therebetween. The supplemental bit assembly seats within the body 18 with the discs 42 and 42' bearing down on bearings 37 and 34, respectively, when the supplemental head is not bearing on core 16. During drilling when the supplemental head bears against the core, however, the supplemental assembly is urged upward slightly, so that an effective fluid bearing is provided between the body 18 and bit stem 24.

A plurality of annular members 54 are stacked about the solid upper stem portion 50 and are supported from shoulder 51 thereof. Each of these members support a plurality of circumferentially, spaced apart vanes 52 that are angled from the vertical, seen more clearly in FIG. 3. Thus several vertically spaced apart groups of vanes are secured to stem portion 50. Similarly another plurality of annular members 62 are stacked against the inner wall of member 18 and are supported from spacer 39. Similar vanes 60 are supported from these members (see FIG. 3), with an annular support 64 surrounding stem portion 50 for giving additional support to these vanes. The ends of vanes 52 are spaced slightly from members 62 on the wall of body 18, and the ends of vanes 60 (or supporting member 64) are spaced slightly from members 54, so that no contact is made between the two assemblies. It will be realized that vanes 60 are also angled from the vertical but in an opposite manner than are vanes 52. Thus a fluid motor is provided for rotating the supplemental bit assembly as fluid is forced under pressure down and between the vanes through passageway 56.

Referring particularly to FIG. 1B, a nut 66 is threaded over the top of stem portion 50 and bears down against the stacked assembly comprising components 54. The inner vanes are held in place and prevented from slipping about the stem in this manner. A recess 67 is provided in the top surface of body 18, so that a pin 68 can be inserted therein that extends upward out of the recess. A circular plate 69, having an opening 71 provided in one side therein and a recess 70 in a lower face of the other side, is positioned on top of members 62 to bear thereon, with recess 70 receiving the protruding pin 68. Opening 71 is considerably larger in diameter than nut 66, so that an ample passageway is provided for fluid to pass from within the cap down onto the fluid motor. The cap 72 is threaded down within an upstanding annular top portion 73 of the body 18 along threads 74, so that the bottom rim of the cap bears down against plate 69. This arrangement thus serves to secure vanes 60 in place to prevent them from slipping on the inner wall of body 18. The cap is hollow with a chamber 75 therein, and threads 78 are provided about the upper neck 76 for securing the cap to drill collar. A port 77 provides communication between the interior of the drill collar and chamber 75.

The lower end of stem portion 50 is provided with a plurality of ports 80 that provide communication between the chamber 81 beneath the vanes and the hollow bore 25 of main body portion 24. Thus a continuous passageway is provided for the drilling fluid through space 56 between the vanes, chamber 81, ports 80, down through bore 25 and chamber 23 to the cutting faces. A plurality of bores 84 (only one being shown in FIG. 1A) are provided in the cylindrical body 18 eccentric to the axis thereof, with corresponding ports 86 provided for communication between these bores and chamber 81. Bores 84 are circumferentially spaced apart and are provided up through body 18 generally opposite the supplemental bit assembly. These bores are open on the bottom ends 88 thereof, so that a part of the drilling fluid can also pass therethrough into the vicinity of the main cutting head.

From the foregoing description, it will be seen that the supplemental bit is caused to rotate relative to the main cutting head as drill fluid is forced through the fluid motor, while the supplemental bit is also caused to rotate with the main head as the latter is rotated. The supplemental cutting head bears flush against material 16 with the plane of the face being disposed horizontally when the axis of the assembly is vertical. The supplemental head tends to cut an annular cavity, but actually disintegrates the core as it is rotated in a circular pattern on an eccentric to the axis of the main head. The two heads do not overlap, but the supplemental head extends to the very edge of the core to remove it entirely. Thus no part of the core is left that can create and cause jamming. Because of the horizontal, flush fit against the core, even fluid distribution is achieved over the cutting face. Moreover, even fluid distribution is attained on the main cutting face.

It will be realized that different type motors can be employed to rotate the supplemental bit assembly, such as an electric motor installed within or above the body 18. Moreover, such a motor, or other means, can be employed to rotate the main cutting head, rather than rotating the main head by rotating the drill stem.

Another embodiment of the invention is shown in FIG. 4, wherein only the lower portion of the entire assembly is changed. In contrast to the face of the supplemental cutting head being elevated above the face of the main cutting head as in the embodiment just described, the supplemental head extends below the main head. Thus an annular lower head 100 is provided with a diamond cutting face 102 provided therein. The head 100 therefore cuts a circular cavity 104 in advance of the main head, in which the diameter of this cavity is substantially equal to the inside diameter of the main cutting head. Otherwise, the construction and operation are as previously described. This embodiment has particular application for drilling in relatively soft formations, such as sand, for example, whereas the first described embodiment is effective in drilling in hard formations. As to the soft formations, much faster penetration can be achieved with the assembly shown in FIG. 4.

Figure 5:
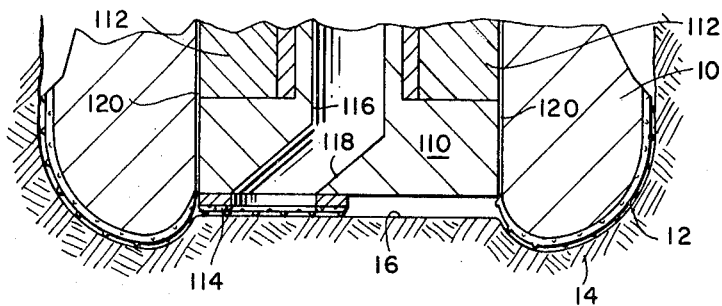
FIG. 5 is a fragmentary, side elevational view, in section, of the bottom portion of a drill bit assembly according to another embodiment of the invention.
Figure 6:
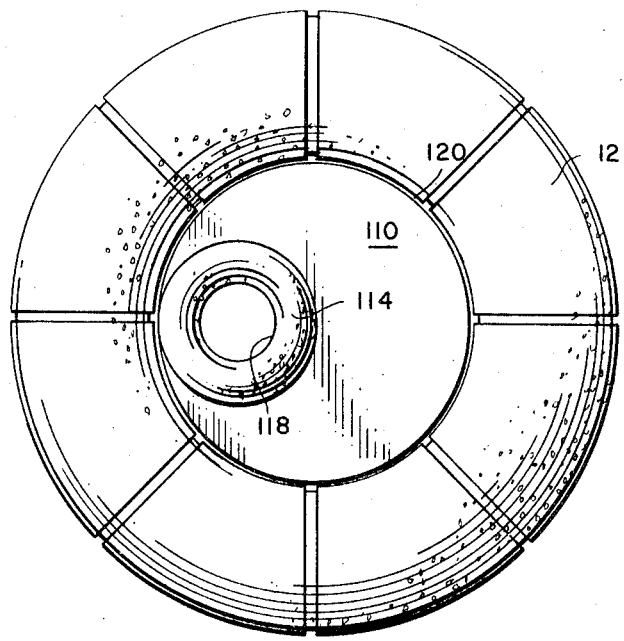
FIG. 6 is a bottom view of the assembly shown in FIG. 5.

Still another embodiment is shown in the fragmentary view of FIG. 5 and the view thereof in FIG. 6. In contrast to the entire supplemental assembly being disposed eccentric to the main assembly axis, the supplemental assembly of this embodiment is aligned axially within body 18, but is also rotated relative thereto. The supplemental assembly is supported from within the main body by suitable bearing assemblies 112 (shown schematically) and comprises a lower end 110 disposed adjacent the lower end of the main assembly within the inner diameter of main head 10. A small annular space 120 is again provided between the main and supplemental heads for the passage of fluid therethrough. The lower end 110 carries an annular cutting head 114 on the bottom thereof that is eccentric to the central axis of the assembly, and which is positioned relative to the main head as earlier described. The supplemental cutting head is again raised with respect to the main cutting head for disintegrating a core that extends up into the main head. A fluid channel 116 is provided in the supplemental assembly along its axis, but which is offset to open through the face of the eccentrically disposed cutting head. Thus the supplemental head is caused to be rotated in an annular pattern to disintegrate the core, while the entire supplemental assembly is also rotated with the main head.

Figure 7:
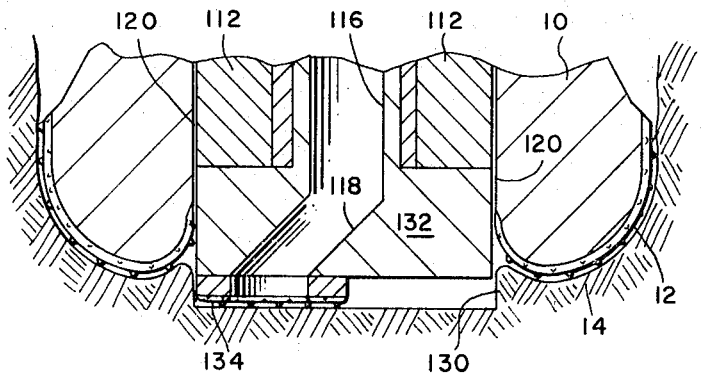
FIG. 7 is a fragmentary, side elevational view, in section, of the bottom portion of a drill bit assembly according to yet another embodiment of the invention.

An embodiment similar to that just described is shown in FIG. 7, wherein the supplemental head 134 carried by the lower end 132 is disposed below the main head. The operation and structure is otherwise the same, with the relative features and applications having already been discussed.

Although the invention has been described with reference to specific embodiments thereof, it will be well understood that many modifications and substitutions can be made that do not depart from the true scope thereof. Accordingly, it is intended that the invention be limited only as defined in the appended claims.

What is claimed is:
1. A rotary drill bit assembly comprising:
   a. a cylindrical body having a central opening in the lower face thereof defining a chamber therein,
   b. an annular main cutting head carried by said body at the lower end thereof,
   c. a supplemental bit assembly supported from within said chamber and having an annular cutting head whose outer diameter is less than the inner diameter of said main cutting head disposed eccentric to the axis of said body and whose face is perpendicular to said axis,
   d. the outer extremity of said supplemental cutting head substantially coinciding with the inner extremity of said main cutting head along a line parallel to the axis of said body, but in nonoverlapping relationship therewith, and extending at least to the axis of said main cutting head, and
   e. means for rotating said supplemental cutting head relative to said main cutting head.

2. A drill bit assembly as set forth in claim 1 wherein the face of said supplemental cutting head is above the face of said main cutting head.

3. A drill bit assembly as set forth in claim 1 wherein the face of said supplemental cutting head extends below the face of said main cutting head.

4. A drill bit assembly as set forth in claim 1 wherein said means for rotating said supplemental cutting head relative to said main cutting head comprises a fluid motor.

5. A drill bit assembly as set forth in claim 1 wherein said body includes a first passageway opening adjacent said main cutting head for the flow of fluid therethrough, and said supplemental bit assembly includes a second passageway opening within the face of said supplemental cutting head for the flow of fluid therethrough.

6. A drill bit assembly as set forth in claim 1 wherein said main cutting head has an interior cylindrical surface, and said supplemental cutting head has an exterior cylindrical surface that is substantially contiguous to said interior surface along said line parallel to the axis of said body.

7. A drill bit assembly as set forth in claim 1 wherein said supplemental bit assembly includes a generally cylindrical stem supported within said chamber eccentric to the axis thereof, and said supplemental cutting head is carried by said stem at the lower end thereof, whereby said stem and said supplemental cutting head are rotated with said cylindrical body eccentric to said axis.

8. A drill bit assembly as set forth in claim 1 wherein said supplemental bit assembly includes a stem supported within said chamber concentric with the axis thereof, and said supplemental cutting head is carried by said stem at the lower end thereof in eccentric relation to the axis of said body, whereby said stem and said supplemental cutting head are rotated with said cylindrical body.

* * * * *